United States Patent [19]

Swier

[11] Patent Number: 4,962,372

[45] Date of Patent: Oct. 9, 1990

[54] SELF LIMITING CABLE SUPERVISORY DEVICE

[76] Inventor: Eugene L. Swier, 48 Munsill Ave., Bristol, Vt. 05443

[21] Appl. No.: 357,922

[22] Filed: May 30, 1989

[51] Int. Cl.⁵ ............................................. G08B 21/00
[52] U.S. Cl. ..................................... 340/640; 324/539
[58] Field of Search ................ 340/632, 640; 324/539, 324/540, 542; 219/528

[56] References Cited

U.S. PATENT DOCUMENTS 4,733,059 3/1988 Goss et al. ........................ 219/528 X Primary Examiner—Joseph A. Orsino
Assistant Examiner—Jeffery A. Hofsass
Attorney, Agent, or Firm—Sughrue, Mion, Zinn, Macpeak & Seas

[57] ABSTRACT

An apparatus for performing a dual mode supervisory operation, according to whether the self limiting cable is "OFF" or "ON". When the self limiting cable is in the "OFF" mode, a solid state device compares a known resistance value of the self limiting cable over its entire length by alternately testing from each end of the cable. The values of fixed comparator resistors are set at a specified ambient temperature depending on the length of the cable. Both high resistance and low resistance samples are compared to determine whether a short or an open exists over the expected operating range. When the self limiting cable is in the "ON" mode, an AC transfer relay switches the solid state supervisory circuit to a Dummy Load. This relay simultaneously switches high voltage to the self limiting cable and a self limiting cable "ON" lamp is lit. A solid state supervisory/override relay prevents false failure signals during ON-OFF switching times. Both visible and audible indicators are provided for warning of a failure.

12 Claims, 2 Drawing Sheets

REGULATOR AND FILTER 1

SELF LIMITING CABLE SUPERVISORY DEVICE

BACKGROUND OF THE INVENTION

1. Field of the Invention

The present invention relates to an apparatus, which tests for shorts and opens in a typical length of Self Limiting Cable (SLC or heat tape).

2. Description of the Prior Art

Self limiting cable includes two parallel conductors which are bonded together in such a way that they are a set distance apart from one another. The pair of wires are surrounded by positive temperature coefficient (PTC) materials, typically a doped polyolefin compound. A typical use of self limiting cable includes thermal protection for pipes or the like in order to maintain such pipes at or above a predetermined temperature regardless of ambient conditions. Applications include building service systems such as sprinkler lines. industrial/commercial processing applications and other critical systems that require temperature control.

Typically. a self limiting cable receives an operating current from a power supply. When the power is applied through the electrical conductors, a resistance between the conductors is developed in the PTC material. The PTC material in turn produces heat which is transferred to the pipes or the like, on which the cable is applied. The cable can be wound spirally about the pipes or layered parallel along the length of the pipe.

During the lifetime of such a self limiting cable. a short or break in the cable may develop which reduces the effectiveness of the cable.

SUMMARY OF THE INVENTION

An object of the present invention is to provide a device for supervising the operation of such a self limiting cable, and more particularly for detecting shorts and opens in the self limiting cable.

The present invention performs a dual mode supervisory operation, according to whether the self limiting cable is "OFF" or "ON". When in the "OFF" mode, a solid state device compares a known resistance value of the self limiting cable over its entire length by alternatively testing from each end of the cable. The values of fixed comparator resistors are set at a specified ambient temperature depending on the length of the cable. Both high resistance and low resistance samples are compared to determine whether a short or an open exists over the expected operating range.

When the self limiting cable is in the "ON" mode, an AC transfer relay switches the solid state supervisory circuit to a dummy load. This relay simultaneously switches high voltage to the self limiting cable and a self limiting cable "ON" lamp is lit. Thus, when high voltage is conducting through the self limiting cable to heat the pipe or other system requiring temperature control, the cable is in the "ON" mode. When the self limiting cable is connected to the supervisory circuit instead of a high voltage, it is in the "OFF" mode. A solid state supervisory/override relay prevents false failure signals during ON-OFF switching times. Both visible and audible indicators are provided.

DESCRIPTION OF THE PREFERRED EMBODIMENT

Figure 1:
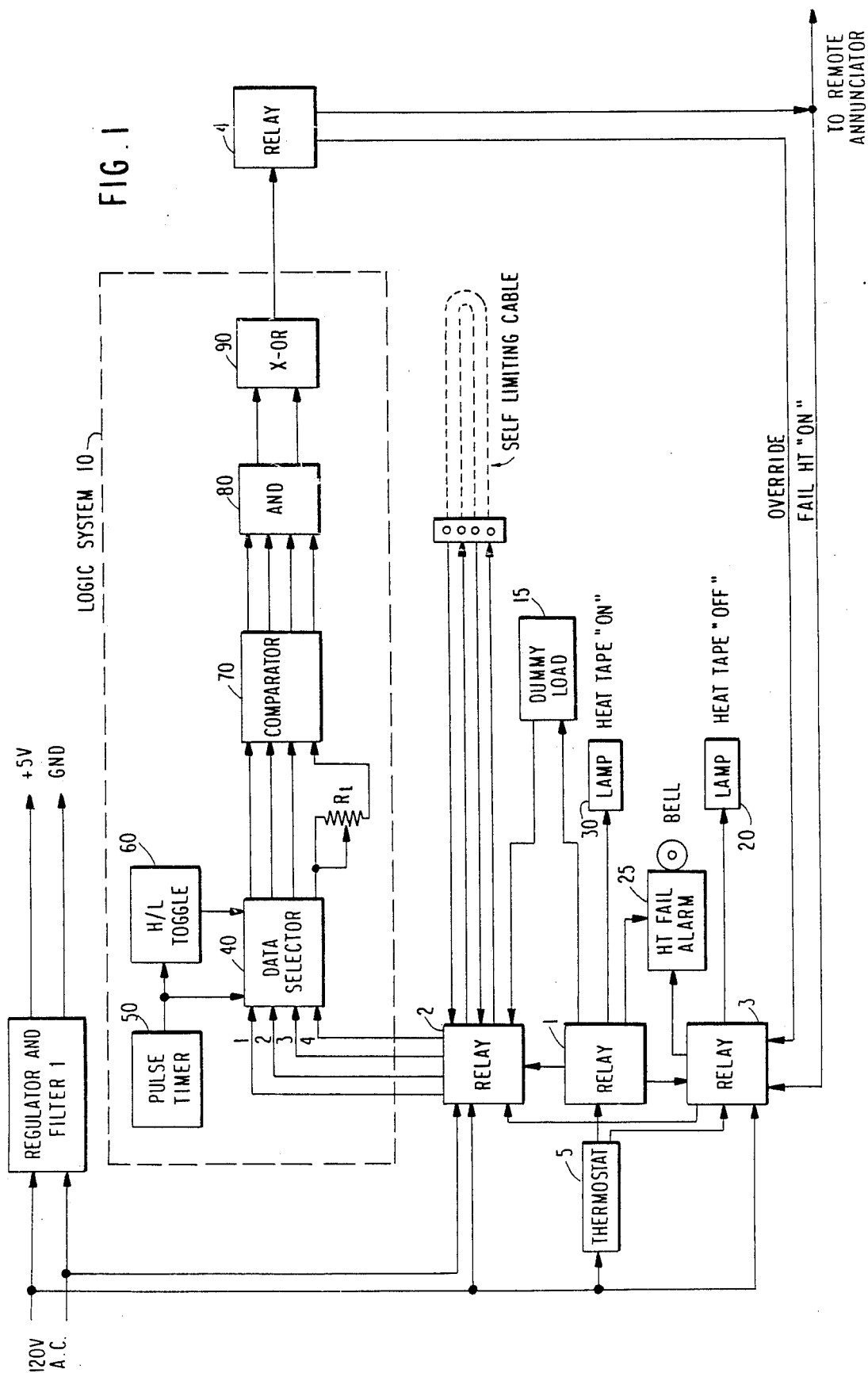
FIG. 1 shows a circuit diagram of the preferred embodiment of the self limiting cable supervisory controller according to the present invention.
Figure 2:
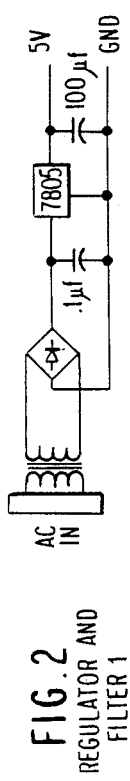
FIG. 2 shows a detailed version of the regulator and Filter 1 of FIG. 1.

According to the dual mode supervisory operation of the present invention the system operates in two separate modes depending upon whether the self limiting cable is "OFF" or "ON". i.e., connected to the logic system 10 or a high voltage source.

When in the "OFF" mode, a solid state logic system 10 compares a known resistance over the entire length of the self limiting cable by alternatively testing from each end of the cable. The values of fixed comparator resistors in the comparator 70 are determined based on the ambient temperature and length of the cable at the time of installation. Both high resistance and low resistance samples are compared to determine whether a short or an open exists over the expected operating range.

When the self limiting cable is in the "ON" mode, an AC transfer relay 2 switches the solid state supervisory circuit 10 to a Dummy Load 15. At the same time, AC relay 2 switches high voltage to the self limiting cable and a controller Heat Tape "ON" lamp 30 is illuminated. A solid state supervisory/override relay 4 prevents false failure signals during ON-OFF switching times. Both visible and audible indicators 20. 25 and 30 are provided by contacts from both the transfer control and supervisory relays.

The system is powered by a low voltage DC power supply and a set of high voltage AC switching devices. The low voltage DC is damped and filtered through the regulator and filter network 1 so as to provide the logic system with a +5vdc operating voltage.

The output from thermostat 5 is sent to four-pole double-throw relays 1 and 3. As a result. when the thermostat 5 is open the relays 1. 3 and another four-pole double-throw relay 2 are deenergized. This in turn causes a Dummy Load 15 to be disconnected from the logic system 10, and relay 3 causes lamp unit 20 to be illuminated indicating that the self limiting cable is "OFF" . while relay 1 causes lamp unit 30, which indicates when the cable is connected to a high voltage source, to cease being illuminated. Simultaneously, the self limiting cable is connected to a data selector switch 40 through the relay 2. The data selector switch 40 is a Dual In-line Package (DIP) configuration which consists of four independent logic driven switches. The switches are set up in a dual-mode to operate in pairs. Each end of the self limiting cable is connected to the switches in the data selector 40 so that each wire 1-4 in the self limiting cable is tied to a switch pair.

A DIP configured pulse timer 50 provides the control logic to open and close each switch pair of the data selector 40. The pulse interval time is regulated by an external resistor-capacitor network.

High/Low Toggle 60 is a DIP configured inverter which drives every other pulse of the pulse timer 50. As a result, one switch pair of the data selector 40 is always high when the other pair is low. The self limiting polyolefin bond between each wire is measured for a high resistance value (maximum resistance) and a low resistance value (possible short) corresponding to the respective switch pairs.

Figure 3:
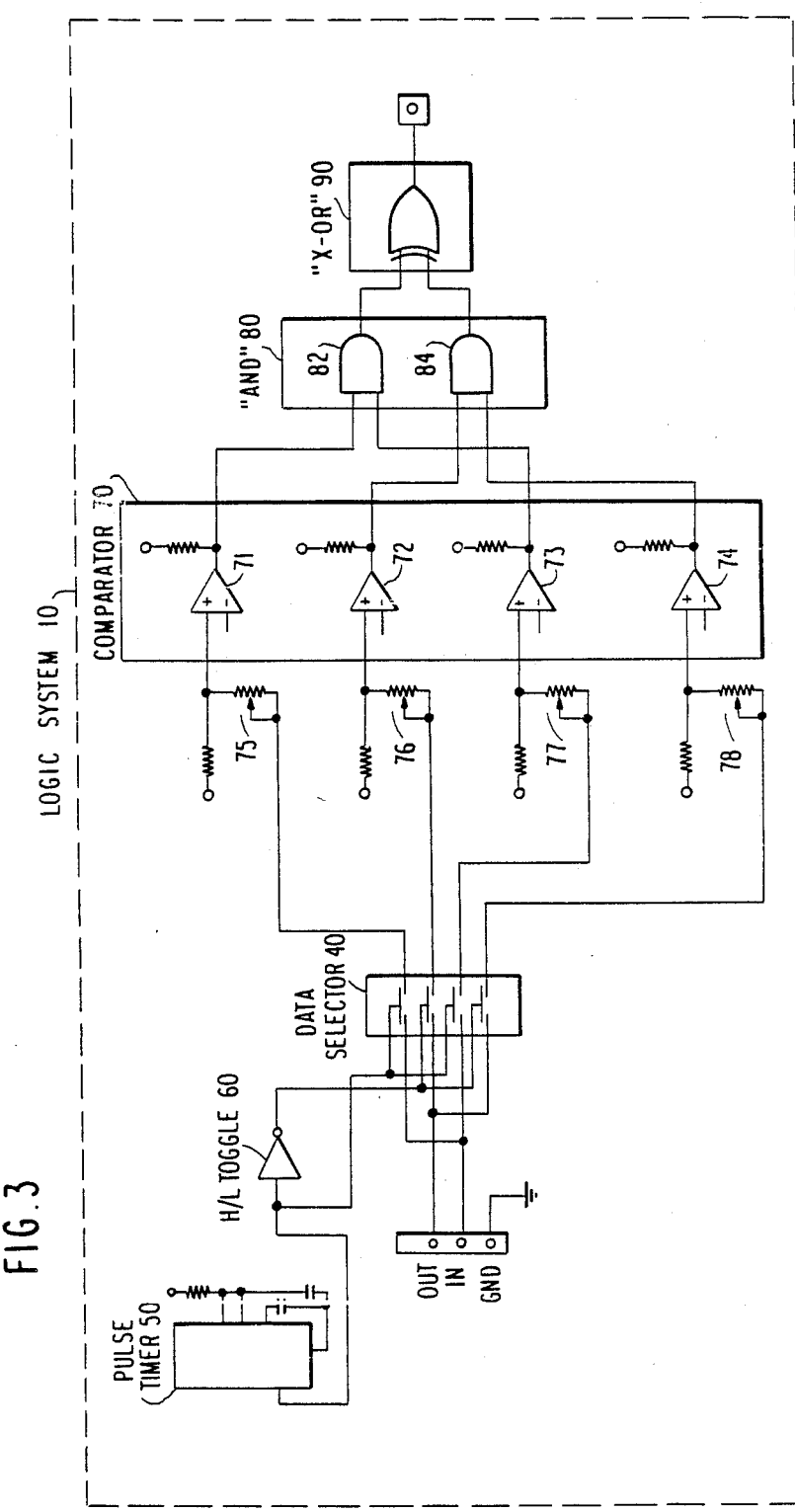
FIG. 3 shows the logic system 10 of FIG. 1 in greater detail.

The high and low resistance values are received by a DIP configured quad comparator 70 where they are compared. The four independent comparators 71-74 of the quad comparator 70 are designed to work in pairs. The interconnection of the four independent comparators 71-74 is illustrated in FIG. 3. The switch input to each high/low pair is applied through a resistor 75-78 which has a value that was selected to be approximately equal to the expected high and low resistance of the self limiting cable when it was first sized for installation. Resistance values which are proven to be high in the comparator 70 are applied to the input of half 82 of the DIP configured AND gate 80. Likewise, the resistance values which are determined to be low in the comparator 70 are applied to the input of the other half 84 of the AND gate 80.

A DIP configured "exclusive" OR (X-OR) gate 90 receives the output of the AND gate 80. The X-0R gate 90 recognizes only proven high "and" low inputs. As a result, the output of the X OR gate 90 is a logic high which maintains a four-pole double-throw relay 4 in a fail safe energized state. A change in the resistance bond across the self limiting cable will cause the relay 4 to deenergize, which in turn activates local and remote output signals.

When the thermostat 5 is closed, relays 1. 2 and 3 are energized. This causes the Dummy Load 15 to be connected to the logic network. Simultaneously, the Cable "ON" lamp 30 is illuminated, the self limiting cable is switched to utility line service and the illumination of Cable "OFF" lamp 20 is discontinued.

The logic supervisory system 10 continues to function "off line". i.e.. as if it were still connected to the self limiting cable, with the Dummy Load 15, thus keeping the supervisory relay 4 energized. If a component in the logic system 10 fails, relay 4 will be deenergized and as a result will cause the overriding by bypassing a set of contacts on relay 3. This activates the Heat Tape System Failure Alarm 25, and a signal is sent to a remote annunciator device.

Contacts of relay 3 are connected in series with the self limiting cable and coil of the relay 3 to provide supervision of the self limiting cable while function "'off line'. i.e.. as if it were still the system is in the "ON" mode. If the self limiting cable fails while the system is in the "ON" mode local and remote signals are generated to warn of the failure.

The logic system 10 may be connected to a display apparatus such as an LED display. a LCD display or cathode ray tube (CRT) in order to provide a display of the location of detected short or open. Such a display may replace the remote annunciator or may be provided in conjunction therewith.

As an alternative to comparing a known resistance over the entire length of the self limiting cable, a signal of a preselected frequency may be sent along the length of the cable, and shorts and opens may be detected based on the reflection of such a signal.

What is claimed is:

1. A dual mode apparatus for supervising self limiting cable comprising:

logic means for comparing a known resistance value of said self limiting cable over its entire length with high and low resistance values measured alternately from each end of said cable when said self limiting cable is in an "OFF" mode and thus disconnected from a high voltage source;
a dummy load;
means for connecting one of said dummy load and said self limiting cable to said logic means, wherein during an ON mode of said cable, said logic means is connected to said dummy load, and said cable is connected to said high voltage source, and during said OFF mode of said cable, said cable is disconnected from said high voltage source, and is connected to said logic means wherein said logic means is operable for providing a signal indicating that no shorts and opens exist in said cable.

2. A dual mode apparatus for supervising self limiting cable as claimed in claim 1, wherein said logic means comprises:

a relay for preventing the generation of signals indicating a failure in asid self limiting cable during switching from said "ON" mode to said "OFF" mode.

3. A dual mode apparatus for supervising self limiting cable as claimed in claim 2, wherein said logic means further comprises:

a comparator;
a data selector switch for alternately supplying said high and low resistance values measured from each end of said cable to said comparator;
a pulse timer to control the switching time of said data selector switch;
an inverter to toggle the pulse timer output;
AND gate means which receives the output of said comparator and provides a first signal indicating that said measured high resistance value of said cable is correct and a second signal indicating that said measured low resistance value of said cable is correct; and
an Exclusive OR gate receiving said first and second signals from said AND gate means, and operable for providing the signal indicating that no shorts and opens exist in said cable,
wherein said signal indicating that no shorts and opens exist in said cable maintains said relay in an energized state.

4. A dual mode apparatus for supervising self limiting cable as claimed in claim 1, wherein said connecting means comprises:

a cable "ON" indicating means;
a cable "OFF" indicating means;
a first relay which activates said cable "ON" indicating means;
a second relay which connects one of said dummy load and said self limiting cable to said logic system; and
a third relay which activates said cable "OFF" indicating means and provides a means for override and cable system failure alarm.

5. A dual mode apparatus for supervising self limiting cable as claimed in claim 4. wherein said connecting means further comprises:

a thermostat;
wherein when said thermostat is open, said first, second and third relays are deenergized, said second relay disconnects said dummy load from said logic system and connects said self limiting cable to said logic means, and said cable "OFF+ indicating means is activated by said third relay and said cable "ON" indicating means is deactivated by said first relay, and
wherein when said thermostat is closed, said first. second and third relays are energized said second relay connects said dummy load to said logic means and disconnects said self limiting cable from said logic means, said cable "ON" indicating means is activated by said first relay and said cable "OFF" indicating means is deactivated by said third relay.

6. A dual mode apparatus for supervising self limiting cable as claimed in claim 3, wherein said data selector switch of said logic means comprises four independent logic driven switches, said switches being set to operate in pairs.

7. A dual mode apparatus for supervising self limiting cable as claimed in claim 6, wherein said logic means further comprises:
a pulse timer: and
a high/low toggle.
wherein said pulse timer provides control logic to open and close each of said switch pairs of said data selector switch, and said high/low toggle drives every other pulse of said pulse timer so that one pair of switches of said data selector switch is always high when the other pair of switches of said data selector switch is low, and
wherein a resistance bond between the wires of said self limiting cable is measured for a high resistance value and a low resistance value corresponding to said respective switch pairs.

8. A dual mode apparatus for supervising self limiting cable as claimed in claim 7, wherein said comparator comprises four comparator units which operate in pairs, and the switch input to each high/low pair is applied through a resistor which is set to be approximately equal to the expected high and low resistance of said self limiting cable.

9. A dual mode apparatus for supervising self limiting cable as claimed in claim 7, wherein said data selector switch, said pulse timer, said high/low toggle, said comparator, said AND gate means and said exclusive OR gate have a dual in-line package configuration.

10. A dual mode apparatus for supervising self limiting cable as claimed in claim 2, wherein said relay is a four-pole double-throw relay.

11. A dual mode apparatus for supervising self limiting cable as claimed in claim 4, wherein said first, second and third relays are four-pole double-throw relays.

12. A dual mode apparatus for supervising self limiting cable as claimed in claim 2, wherein a change in the resistance bond across said self limiting cable causes said relay to deenergize, said relay then activates an alarm in said connecting means and outputs a signal to activate an annunciator device at a remote location.

* * * * *